April 22, 1941.  T. BREWER  2,239,282
FERRULE
Filed Feb. 13, 1940
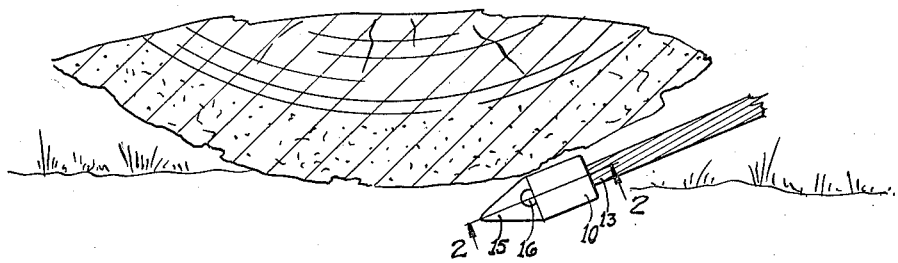
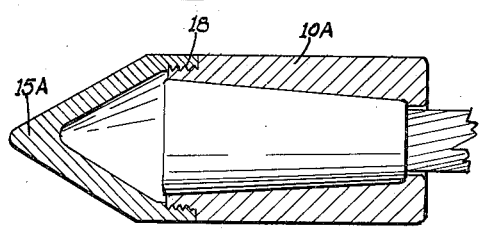 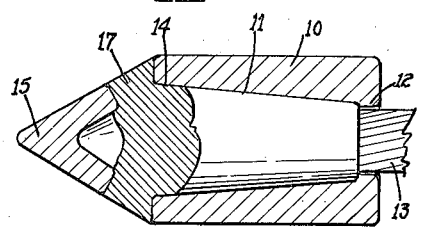
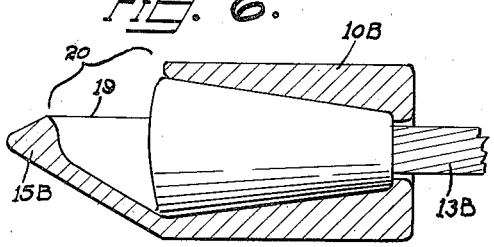 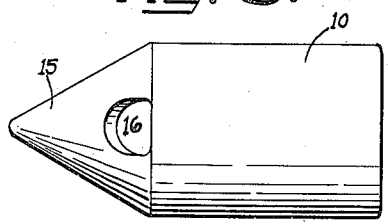
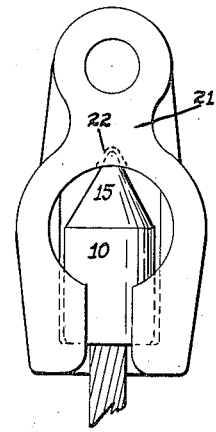 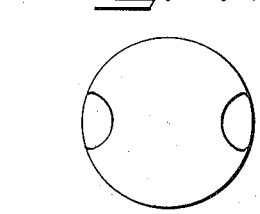
INVENTOR
THOMAS BREWER
BY
ATTORNEY Patented Apr. 22, 1941

2,239,282

UNITED STATES PATENT OFFICE 2,239,282

FERRULE

Thomas Brewer, Kelso, Wash.

Application February 13, 1940, Serial No. 318,722

3 Claims. (Cl. 24—123)

This invention relates generally to logging and particularly to a ferrule.

The main object of this invention is to construct an improved form of ferrule by means of which a choker line may be more easily passed under and around logs than is now the case.

The second object is to utilize the ferrule itself as a means for attaching a point to the end of a choker.

These and other objects are accomplished in the manner set forth in the following specification as illustrated in the accompanying drawing in which:

Fig. 1 is a fragmentary transverse section of a log resting on the ground and showing a choker with my device attached thereto, being passed under the log.

Fig. 2 is a longitudinal section through the preferred form of the device.

Fig. 3 is a side elevation of the device shown in Fig. 2.

Fig. 4 is an end elevation of the device shown in Fig. 2.

Fig. 5 is a longitudinal section through a modified form of the device showing a removable point.

Fig. 6 is a longitudinal section through another form of the device showing one side of the point cut away.

Fig. 7 is a side elevation of a choker with which my device is employed.

Similar numerals refer to similar parts throughout the several views.

Referring in detail to the drawing there is shown in Figs. 1 to 4 inclusive, a ferrule 10 having a tapering opening 11 formed therein whose smaller end 12 is large enough to freely receive the end of a choker line 13, and whose large end 14 is covered by a pointed end 15 having the lateral openings 16 through which the molten zinc 17 can be inserted or removed.

It will be understood that it is a common practice to fasten a ferrule to a choker by simply dipping the end of the choker 13 into muriatic acid to cleanse it, then inserting it into the ferrule and separating the cable wires and then filling the tapering recess around the wires by means of molten zinc 17, care being taken not to overheat the molten zinc sufficiently to anneal the cable wires.

Ferrules now in common use have a blunt point which makes it difficult to pass them under logs and through brush. My invention resides in the provision of a point 15 which expedites the insertion of the choker and strengthens the ferrule itself.

In the form of the device shown in Fig. 5, the point 15A is removably mounted on the ferrule 10A by means of the thread 18. For this form of the device, the application and removal of the ferrule 10A is identical to those now in common use.

In the form shown in Fig. 6, the point 15B of the body 10B is cut away along the line 19 leaving an opening 20 through which the end of the cable 13B may be passed for fraying purposes.

In Fig. 7 there is shown a choker hook 21 which is of the type commonly used for this purpose except that a provision is made in the form of a notch 22 to receive the point 15 of the ferrule 10.

From the foregoing it can be seen that by the simple addition of a point to the end of a choker ferrule, it can be possible to more easily pass a choker around a log, thereby effecting a considerable saving in time and explosives ordinarily expended in passing a blunt ferrule between a log and the ground, between a pair of logs and between a log and surrounding brush.

While I have thus illustrated and described my invention it is not my intention to be limited to the exact form shown but I intend to cover all such forms of the device and modifications thereof as fall fairly within the appended claims.

I claim:

1. A ferrule of the class described having a tapering recess formed therein and having a pointed end disposed in front of the enlarged end of said recess.

2. A ferrule of the class described having a tapering opening formed along the axis thereof and having an integral pointed end disposed over the enlarged end of said opening adapted to facilitate the passage of said ferrule around a log.

3. A ferrule of the class described consisting of a cylindrical body having a tapering recess formed through said body, through the smaller end of which a cable may be passed, a pointed end formed across the enlarged end of said recess on one end of said body said pointed end having an opening in the side thereof through which molten zinc may pass.

THOMAS BREWER.